United States Patent
Wang

(10) Patent No.: US 12,338,900 B2
(45) Date of Patent: Jun. 24, 2025

(54) CERAMIC CONTROL VALVE

(71) Applicant: Hsiang-Shih Wang, Changhua (TW)

(72) Inventor: Hsiang-Shih Wang, Changhua (TW)

( * ) Notice: Subject to any disclaimer, the term of this patent is extended or adjusted under 35 U.S.C. 154(b) by 71 days.

(21) Appl. No.: 18/381,570

(22) Filed: Oct. 18, 2023

(65) Prior Publication Data

US 2025/0129859 A1  Apr. 24, 2025

(51) Int. Cl.
*F16K 11/078* (2006.01)
*F16K 11/00* (2006.01)

(52) U.S. Cl.
CPC ...... *F16K 11/0782* (2013.01); *F16K 11/0787* (2013.01); *F16K 19/006* (2013.01); *Y10T 137/9464* (2015.04)

(58) Field of Classification Search
CPC ............. F16K 11/0782; F16K 11/0787; F16K 19/006; Y10T 137/9464
USPC ........................................................ 137/801
See application file for complete search history.

(56) References Cited

U.S. PATENT DOCUMENTS

| | | | |
|---|---|---|---|
| 5,681,028 A * | 10/1997 | Cook .................... | F16K 27/045 251/192 |
| 11,255,463 B2 * | 2/2022 | Thurau ................. | F16K 41/046 |
| 2006/0192166 A1 * | 8/2006 | Lange ..................... | F16K 3/08 251/264 |

\* cited by examiner

*Primary Examiner* — John Bastianelli
(74) *Attorney, Agent, or Firm* — Ying-Ting Chen; Law Office of Michael Chen

(57) ABSTRACT

A ceramic control valve may include a shell, a valve stem, a driving valve piece, a fixed valve piece, and a buffer member. The shell has an axial hole at the center portion thereof, and the axial hole comprises a first hole portion and a second hole portion. The lower end of the axial hole has an engaging periphery protruding from the inner periphery of the axial hole, and the first hole portion has at least a water outlet laterally penetrating through the shell. The valve stem comprises a driving end, an adjustment section, and a control shaft sequentially connected together, and a rotating base is securely engaged on the driving end, and the driving end is connected to the driving valve piece through the rotating base. The adjustment section has a plurality of peripheral grooves thereon, and each peripheral grooves comprises a torque adjustment ring disposed thereon.

8 Claims, 10 Drawing Sheets

CERAMIC CONTROL VALVE

FIELD OF THE INVENTION

The present invention relates to a ceramic control valve and more particularly to a high-torque, wall-mounted precision ceramic control valve designed for controlling on/off operation and flow rate of water.

BACKGROUND OF THE INVENTION

The precision ceramic control valve is a commonly and widely used for water system. Currently known precision ceramic control valve is often directly mounted on vertical walls or other surfaces, allowing it to be connected to a water source. The precision ceramic control valve comprises a valve stem protruding out of the control valve, and the valve stem is connected to an external control device. By rotating the control device, the control valve is adapted to control on/off operation and flow rate of the water.

However, the conventional control valve has following disadvantages: (i) the control device usually has a heavy rotating handle and the valve stem is simply inserted in to the precision ceramic control valve without any other interfering elements, that makes the valve stem prone to drooping or accidentally triggers a boiling water due to the excessive weight of the control component, resulting in a loss of functionality and inconvenience in the use of water; and (ii) it is common to install a shielding component on the outer side of the wall for decorative purpose, and when the shielding component is placed, the valve stem may not extend sufficiently to connect to the control component and the extension is required, which leads extra trouble and inconvenience. Therefore, there remains a need for a new and improved design for a ceramic control valve to overcome the problems presented above.

SUMMARY OF THE INVENTION

The present invention provides a ceramic control valve comprising a shell, a valve stem, a driving valve piece, a fixed valve piece, and a buffer member. The shell has an axial hole at the center portion thereof, and the axial hole comprises a first hole portion and a second hole portion, and the diameter of the first hole portion is larger than that of the second hole portion. The lower end of the axial hole has an engaging periphery protruding from the inner periphery of the axial hole, and the first hole portion has at least a water outlet laterally penetrating through the shell. The valve stem comprises a driving end, an adjustment section, and a control shaft sequentially connected together, and a rotating base is securely engaged on the driving end, and the driving end is connected to the driving valve piece through the rotating base. The adjustment section has a plurality of peripheral grooves thereon, and each of the peripheral grooves comprises a torque adjustment ring disposed thereon. The control shaft is sharply extended from the top of the valve stem, and a plurality of cutting peripheries are formed on the control shaft. The cutting peripheries are adapted to be cut to adjust the length of the control shaft to meet various requirements. When the valve stem is positioned into the shell, the control shaft is configured to penetrate out from the second hole portion, and the adjustment section is positioned in the second hole portion. The torque adjustment ring is abutted against the wall of the second hole portion, and the number of the torque adjustment rings is adjusted according to the desired torque level. The driving valve piece has a flow opening, and the fixed valve piece comprises a water through hole thereon. The driving valve piece and the fixed valve piece are stacked and positioned into the first hole portion of the shell together, and the fixed valve piece is secured in the shell. The driving valve piece is coupled with the rotating base, and the valve stem is rotated to drive the driving valve piece through the rotating base to have synchronous rotation, so as to change the relative positions between the flow opening and the water through hole, thereby controlling the on/off operation of water and the water flow rate. The buffer member comprises a buffer ring, a retaining ring, and an O-ring, and the buffer ring and the O-ring are made of elastic materials. The retaining ring has a retaining portion and two engaging groves thereon, and the two engaging grooves are respectively coupled with the buffer ring and the O-ring. The retaining portion is abutted against the engaging periphery so as to connect the buffer member on the lower end of the shell.

Comparing with conventional ceramic control valve, the present invention is advantageous because: (i) the control shaft is adapted to be significantly extended from the top of the valve stem, so as to allow a control member such as a handle to connect to the ceramic control valve without extra extension by a connecting rod; (ii) when the length of the extended control shaft is too long, the user can easily cut off the excessive part of the control shaft through the cutting periphery; (iii) the adjustment section of the valve stem is coupled with the second hole portion, so that a greater resistance is formed between the valve stem and the shell to prevent the valve stem from being affected by the weight of the control member and inadvertently moving downward or rotating the valve stem into the open position; and (iv) the buffer ring and the O-ring are made of elastic material, and the buffer ring is coupled with the fixed valve piece, so that when the driving valve piece is rotated, the fixed valve piece is adapted to compress the buffer ring so as to prevent the generation of excessive forward force on the fixed valve piece, reducing wear and tear between the driving valve piece and the fixed valve piece; and (v) the elasticity of the O-ring and the buffer ring is configured to allow the O-ring and the buffer ring to firmly bear against the valve body and the fixed valve piece, thereby achieving the water leak prevention effect.

BRIEF DESCRIPTION OF THE DRAWINGS

FIG. 10 is a schematic view of the direction of water flow when the ceramic control valve of the present invention is turned on.

DETAILED DESCRIPTION OF THE INVENTION

Figure 1:
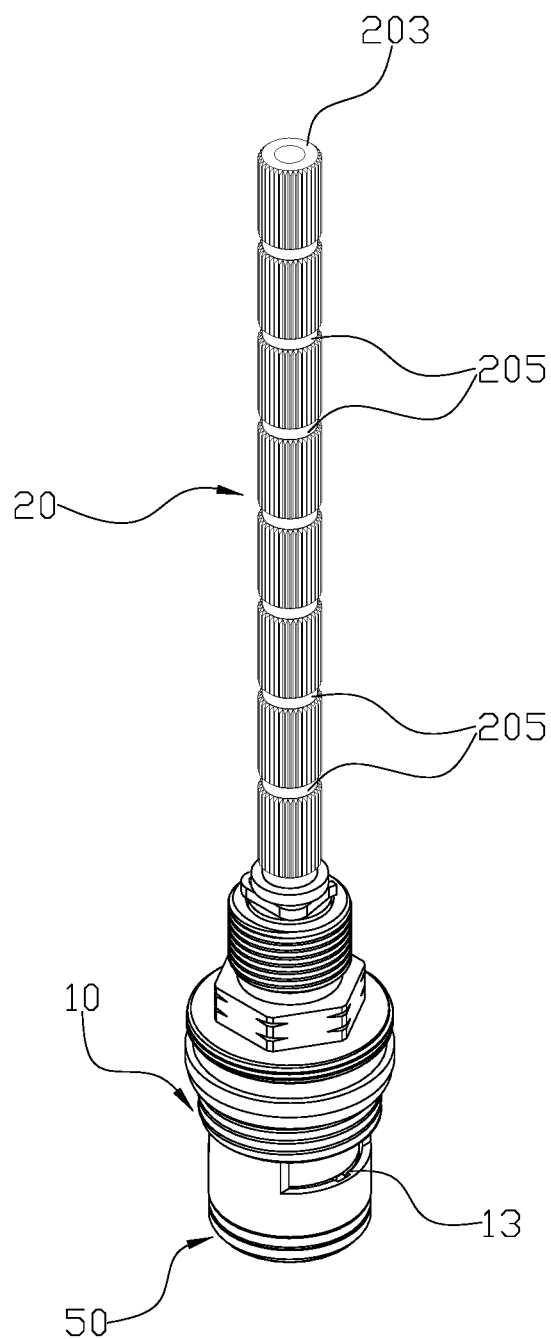
FIG. 1 is a three-dimensional assembly view of a ceramic control valve of the present invention.
Figure 2:
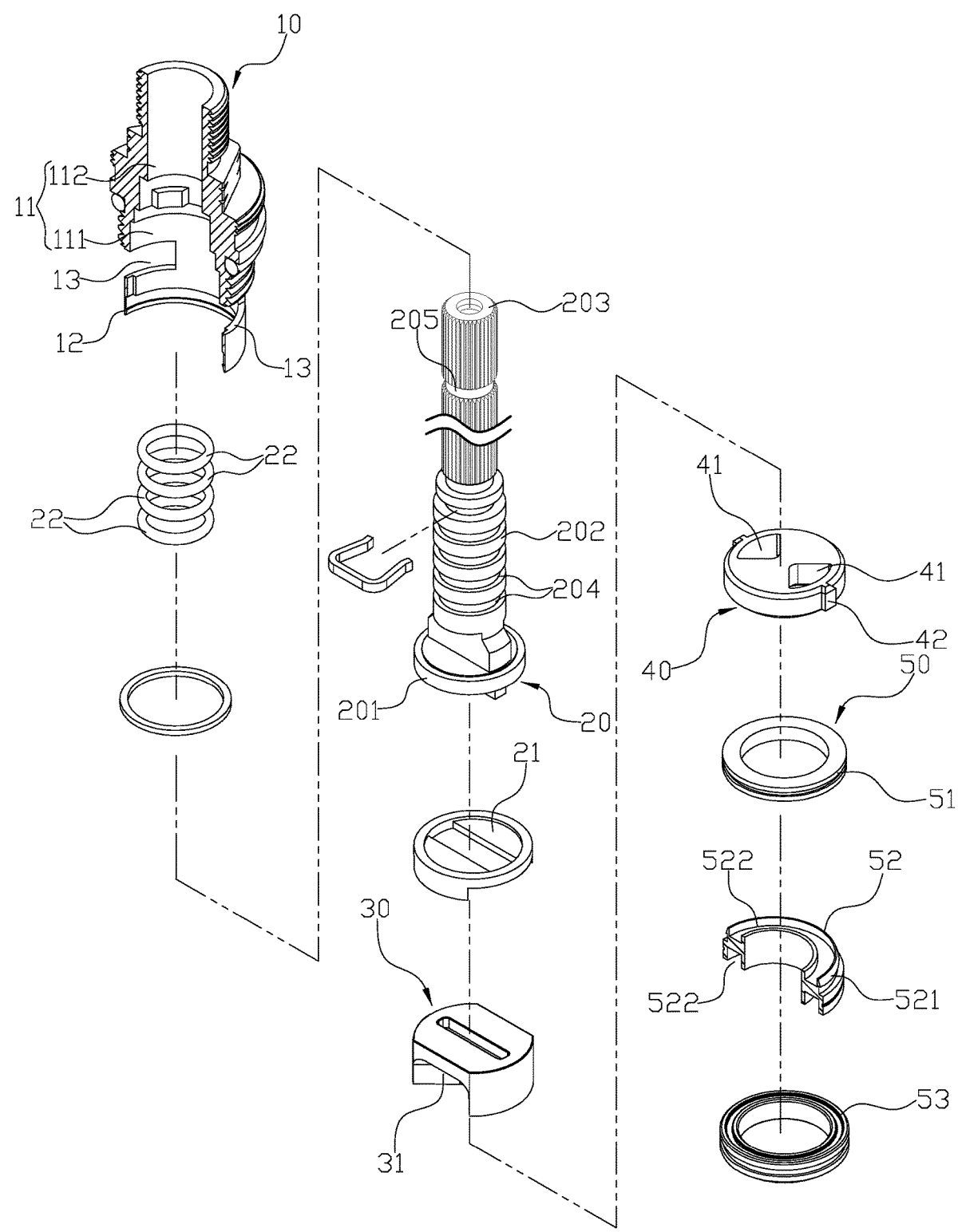
FIG. 2 is a three-dimensional exploded view of the ceramic control valve of the present invention.
Figure 3:
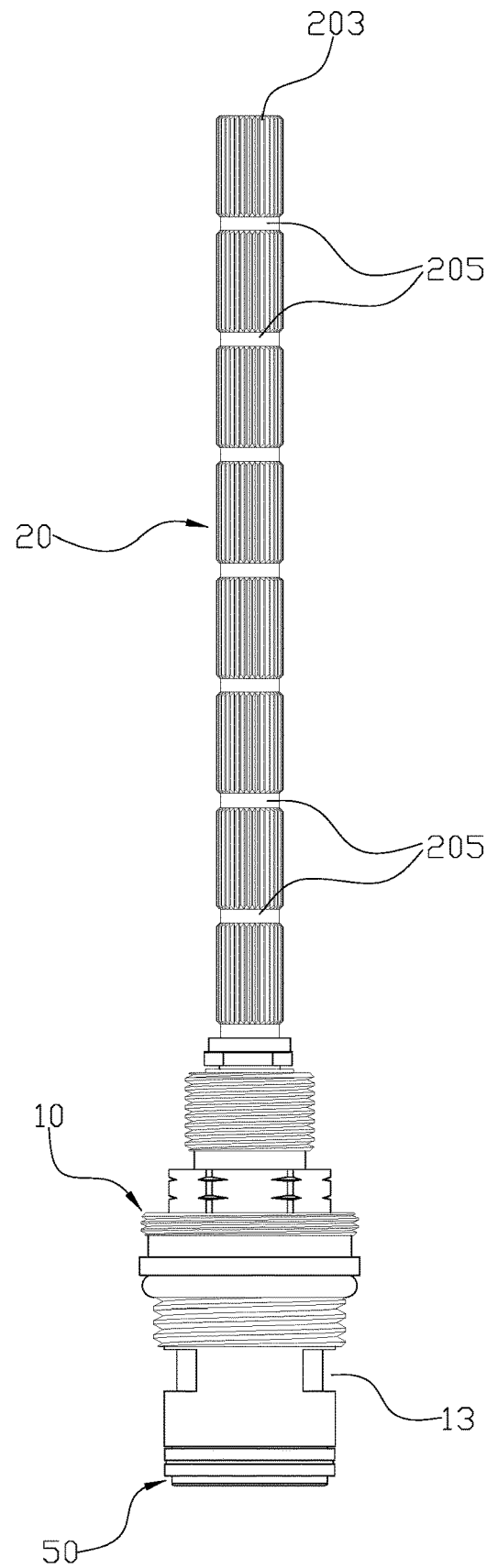
FIG. 3 is a plan assembly view of the ceramic control valve of the present invention.
Figure 4:
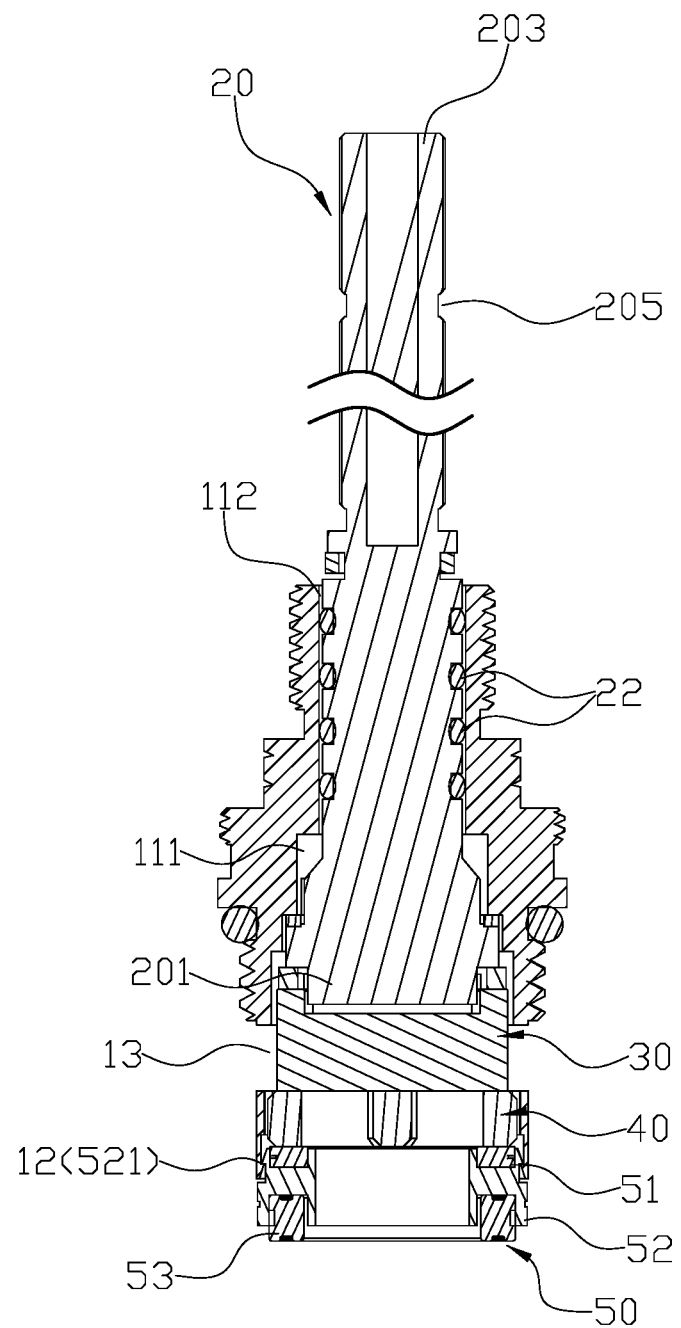
FIG. 4 is a sectional assembly view of the ceramic control valve of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, the present invention provides a ceramic control valve comprising a shell (10), a valve stem (20), a driving valve piece (30), a fixed valve piece (40), and a buffer member (50). The shell (10) has an axial hole (11) at the center portion thereof, and the axial hole (11) comprises a first hole portion (111) and a second hole portion (112), and the diameter of the first hole portion (111) is larger than that of the second hole portion (112). Moreover, the lower end of the axial hole (11) has an engaging periphery (12) protruding from the inner periphery of the axial hole (11), and the first hole portion (111) has at least a water outlet (13) laterally penetrating through the shell (10). The valve stem (20) comprises a driving end (201), an adjustment section (202), and a control shaft (203) sequentially connected together, and a rotating base (21) is securely engaged on the driving end (201), and the driving end (201) is connected to the driving valve piece (30) through the rotating base (201). Also, the adjustment section (202) has a plurality of peripheral grooves (204) thereon, and each of the peripheral grooves (204) comprises a torque adjustment ring (22) disposed thereon. The control shaft (203) is significantly extended from the top of the valve stem (20), and a plurality of cutting peripheries (205) are formed on the control shaft (203). The cutting peripheries (205) are adapted to be cut to adjust the length of the control shaft (203) to meet various requirements. When the valve stem (20) is positioned into the shell (10), the control shaft (203) is configured to penetrate out from the second hole portion (112), and the adjustment section (202) is positioned in the second hole portion (112). Furthermore, the torque adjustment ring (22) is abutted against the wall of the second hole portion (112), and the number of the torque adjustment rings (22) is adjusted according to the desired torque level. The driving valve piece (30) has a flow opening (31), and the fixed valve piece (40) comprises a water through hole (41) thereon. The driving valve piece (30) and the fixed valve piece (40) are stacked and positioned into the first hole portion (111) of the shell (10) together, and the fixed valve piece (40) is secured in the shell (10). The driving valve piece (30) is coupled with the rotating base (21), and the valve stem (20) is rotated to drive the driving valve piece (30) through the rotating base (21) to have synchronous rotation, so as to change the relative positions between the flow opening (31) and the water through hole (41), thereby controlling the on/off operation of water and the water flow rate. The buffer member (50) comprises a buffer ring (51), a retaining ring (52), and an O-ring (53), and the buffer ring (51) and the O-ring (53) are made of elastic materials. The retaining ring (52) has a retaining portion (521) and two engaging groves (522) thereon, and the two engaging grooves (522) are respectively coupled with the buffer ring (51) and the O-ring (53). Also, the retaining portion (521) is abutted against the engaging periphery (12) so as to connect the buffer member (50) on the lower end of the shell (10).

In one embodiment, the shell (10) comprises two water outlets (13).

In another embodiment, the two water outlets (13) are positioned at opposite positions.

In still another embodiment, the torque adjustment ring (22) is a rubber ring with elasticity.

In a further embodiment, at least a rib (42) is formed on a periphery of the fixed valve piece (40), and the fixed valve piece (40) is secured in the first hole portion (111) of the axial hole (11) through the rib (42).

In still a further embodiment, the engaging periphery (12) and the retaining ring (52) are mutually interlocked in hook shape.

In an advantageous embodiment, the buffer ring (51) is a rubber ring.

In still an advantageous embodiment, the O-ring (53) is a rubber ring.

Figure 5:
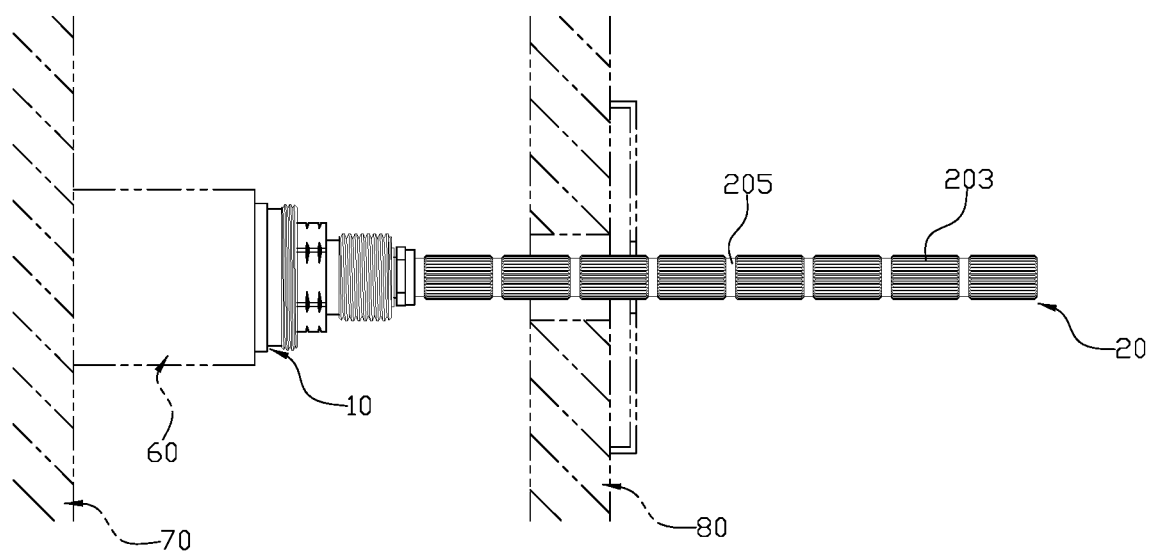
FIG. 5 is a schematic view illustrating the ceramic control valve of the present invention is installed on a wall.
Figure 6:
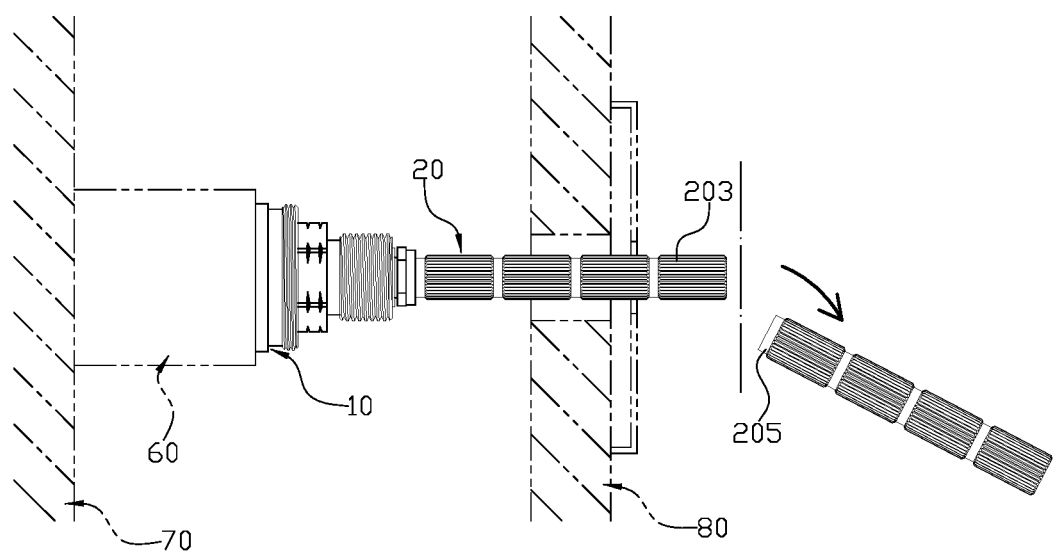
FIG. 6 is a schematic view illustrating an overlong control shaft is cut in the present invention.
Figure 7:
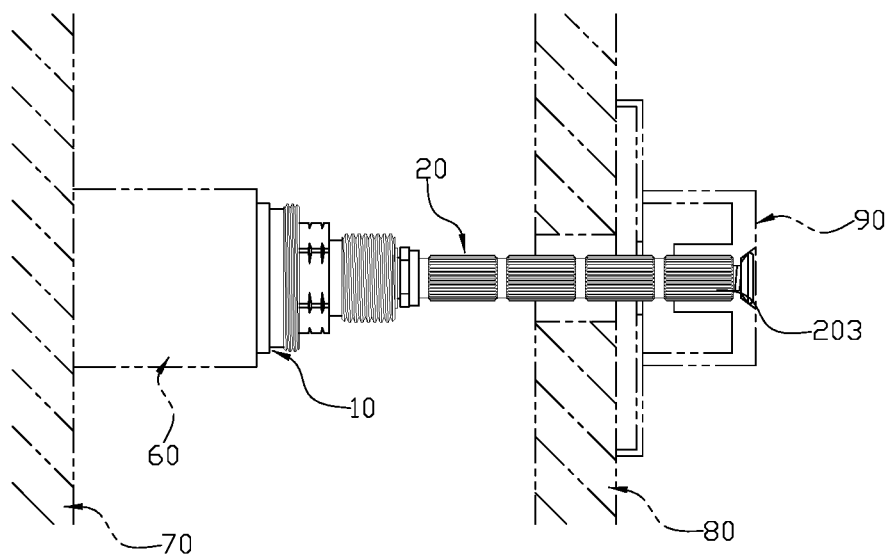
FIG. 7 is a schematic view illustrating a control member is connected to the control shaft of the ceramic control valve on the outside of a shield member in the present invention.
Figure 8:
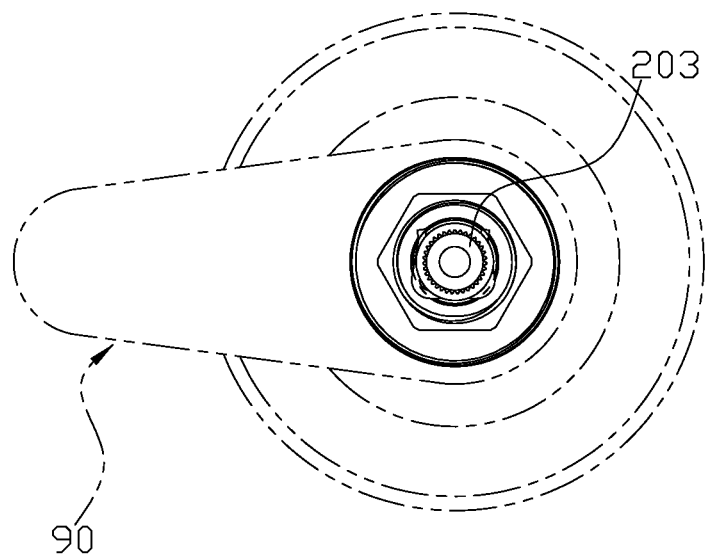
FIG. 8 is a schematic view illustrating the control member is in water-off position in the present invention.

In actual application, the ceramic control valve is positioned into a valve body (60), and the valve body (60) is connected to the water source and water outlet equipment (such as a faucet). When the valve body (60) is installed on a surface like a wall (70) and the outer side of the surface is covered by a shield member (80) such as a decorative panel, a cabinet, and a countertop, the control shaft (203) is adapted to be significantly extended from the top of the valve stem (20), so as to allow a control member (90) such as a handle to connect to the ceramic control valve without extra extension by a connecting rod (as shown in FIGS. 5, 7 and 8). Also, referring to FIG. 6, when the length of the extended control shaft (203) is too long, the user can easily cut off the excessive part of the control shaft (203) through the cutting periphery (205). Meanwhile, the adjustment section (202) of the valve stem (20) is coupled with the second hole portion (112), so that a greater resistance is formed between the valve stem (20) and the shell (10). Therefore, when the control member (90) is a large mass, the resistance can be utilized to prevent the valve stem (20) from being affected by the weight of the control member (90) and inadvertently moving downward or rotating the valve stem (20) into the open position, thereby ensuring greater convenience in use. In addition, the design also helps prevent the wasteful and unanticipated use of valuable water resources.

Figure 9:
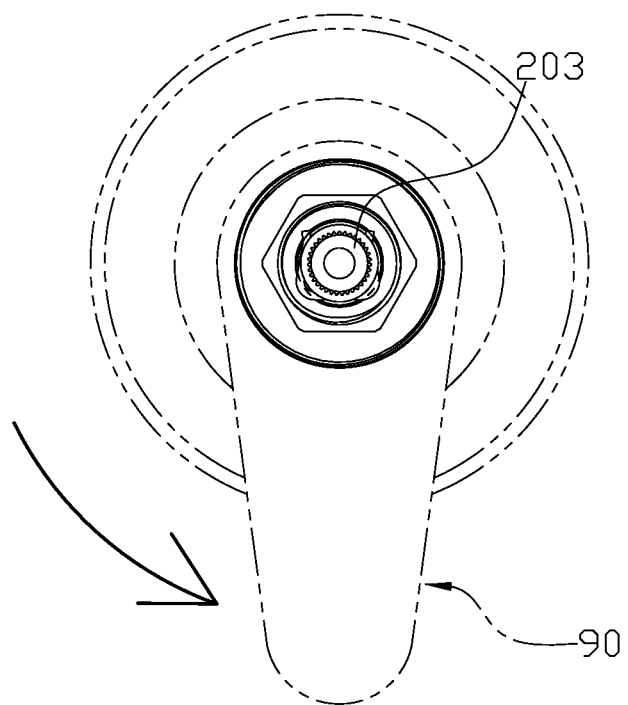
FIG. 9 is a schematic view illustrating the control member is rotated to turn on the water source in the present invention.
Figure 10:
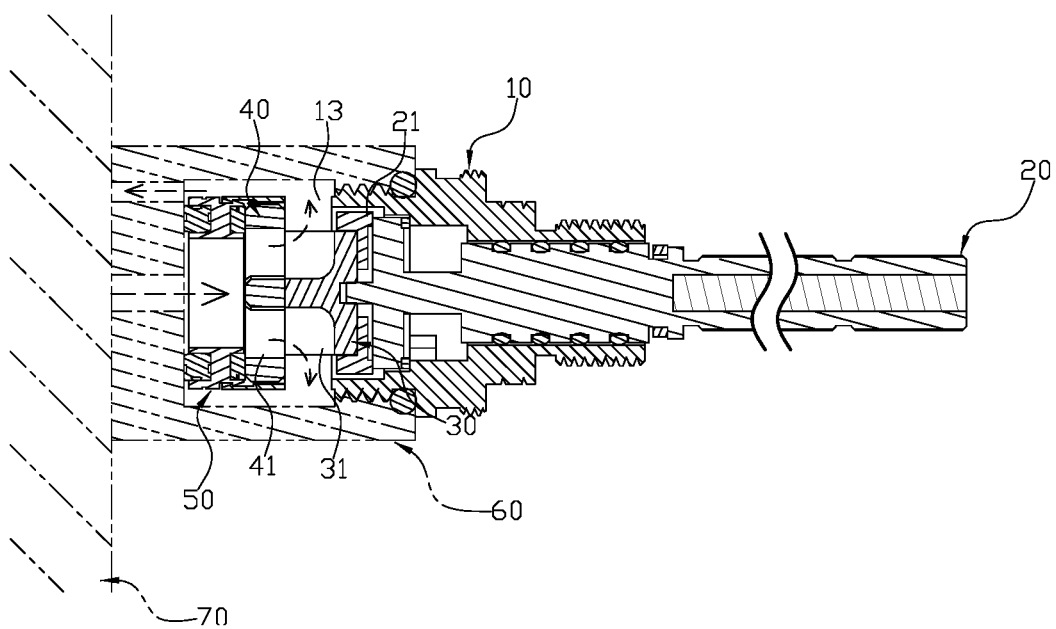

Referring to FIG. 9, the control member (90) is rotated to turn on the ceramic control valve, and the water is adapted to flow through the hollow ring portion of the buffer member (50), the fixed valve piece (40), the driving valve piece (30), and out of the valve body (60) through the water outlet (13) (as shown in FIG. 10). The buffer ring (51) and the O-ring (53) are made of elastic material, and the buffer ring (51) is coupled with the fixed valve piece (40), so that when the driving valve piece (30) is rotated, the fixed valve piece (40) is adapted to compress the buffer ring (51) so as to prevent the generation of excessive forward force on the fixed valve piece (40), reducing wear and tear between the driving valve piece (30) and the fixed valve piece (40). It has the effect of increasing the service life and also prevents the situation where the driving valve piece (30) gets stuck and cannot rotate due to the need to overcome frictional resistance. Moreover, the elasticity of the O-ring (53) and the buffer ring (51) is configured to allow the O-ring (53) and the buffer ring (51) to firmly bear against the valve body (60) and the fixed valve piece (40), thereby achieving the water leak prevention effect.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A ceramic control valve comprising a shell, a valve stem, a driving valve piece, a fixed valve piece, and a buffer member;
    wherein the shell has an axial hole at the center portion thereof, and the axial hole comprises a first hole portion and a second hole portion, and the diameter of the first hole portion is larger than that of the second hole portion; the lower end of the axial hole has an engaging periphery protruding from the inner periphery of the axial hole, and the first hole portion has at least a water outlet laterally penetrating through the shell;
    wherein the valve stem comprises a driving end, an adjustment section, and a control shaft sequentially connected together, and a rotating base is securely engaged on the driving end, and the driving end is connected to the driving valve piece through the rotating base; the adjustment section has a plurality of peripheral grooves thereon, and each of the peripheral grooves comprises a torque adjustment ring disposed thereon; the control shaft is sharply extended from the top of the valve stem, and a plurality of cutting peripheries are formed on the control shaft; the cutting peripheries are adapted to be cut to adjust the length of the control shaft to meet various requirements; when the valve stem is positioned into the shell, the control shaft is configured to penetrate out from the second hole portion, and the adjustment section is positioned in the second hole portion; the torque adjustment ring is abutted against the wall of the second hole portion, and the number of the torque adjustment rings is adjusted according to the desired torque level;
    wherein the driving valve piece has a flow opening, and the fixed valve piece comprises a water through hole thereon; the driving valve piece and the fixed valve piece are stacked and positioned into the first hole portion of the shell together, and the fixed valve piece is secured in the shell; the driving valve piece is coupled with the rotating base, and the valve stem is rotated to drive the driving valve piece through the rotating base to have synchronous rotation, so as to change the relative positions between the flow opening and the water through hole, thereby controlling the on/off operation of water and the water flow rate;
    wherein the buffer member comprises a buffer ring, a retaining ring, and an O-ring, and the buffer ring and the O-ring are made of elastic materials; the retaining ring has a retaining portion and two engaging groves thereon, and the two engaging grooves are respectively coupled with the buffer ring and the O-ring; the retaining portion is abutted against the engaging periphery so as to connect the buffer member on the lower end of the shell.

2. The ceramic control valve of claim 1, wherein the shell comprises two water outlets thereon.

3. The ceramic control valve of claim 2, wherein the two water outlets are positioned at opposite positions.

4. The ceramic control valve of claim 1, wherein the torque adjustment ring is a rubber ring with elasticity.

5. The ceramic control valve of claim 1, wherein at least a rib is formed on a periphery of the fixed valve piece, and the fixed valve piece is secured in the first hole portion of the axial hole through the rib.

6. The ceramic control valve of claim 1, wherein the engaging periphery and the retaining ring are mutually interlocked in hook shape.

7. The ceramic control valve of claim 1, wherein the buffer ring is a rubber ring.

8. The ceramic control valve of claim 1, wherein the O-ring is a rubber ring.

* * * * *